Nov. 28, 1967  J. B. GIVEN  3,355,160
CRUCIBLE MELTING FURNACE
Filed April 14, 1965

INVENTOR.
JOHN BREWSTER GIVEN
BY William C. Nealon
ATTORNEY

United States Patent Office 3,355,160
Patented Nov. 28, 1967

3,355,160
CRUCIBLE MELTING FURNACE
John Brewster Given, Perrysburg, Ohio, assignor to Harbison-Walker Refractories Company, Pittsburgh, Pa., a corporation of Pennsylvania
Filed Apr. 14, 1965, Ser. No. 447,997
6 Claims. (Cl. 266—33)

ABSTRACT OF THE DISCLOSURE

A cover for crucible melting furnaces having a centrally located flue opening consisting of a metal plate with outer peripheral downwardly extending sidewalls, a plurality of V-shaped metal anchors secured to the undersurface of the metal plate at the apex thereof and a layer of monolithic refractory material in contact with said metal plate and sidewalls and impaled by the V-shaped anchors.

---

Figures 1, 2:
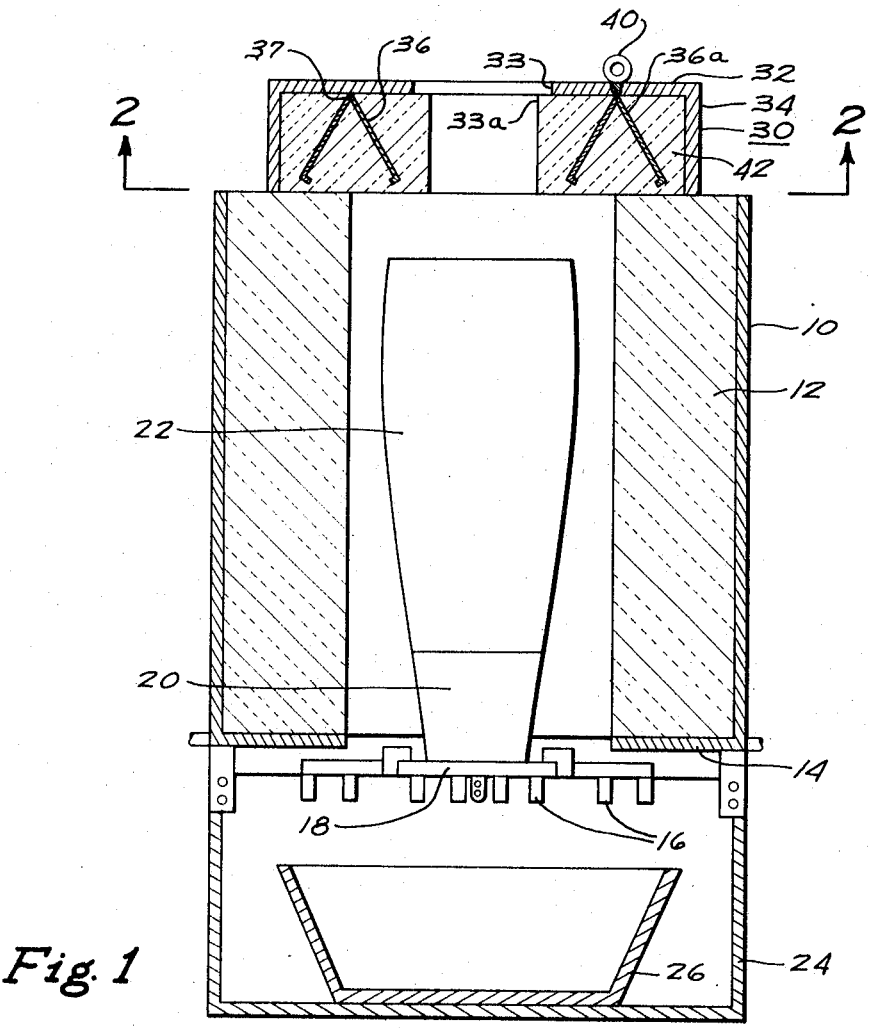

The cover of a crucible melting furnace, probably more than any other part thereof, is exposed to the full heat of both the flame and the gaseous products of combustion, which sweep through the furnace and through the flue opening in the furnace cover. Accordingly, the cover must be mechanically strong to withstand the attack of corrosive substances which are carried in contact therewith by the gases passing through the furnace and the refractory material employed in the cover must be capable of withstanding very high temperature. Also, since the cover of a crucible melting furnace, in most instances, must be continuously raised and lowered to facilitate removal of the crucible from the furnace after each heat and the subsequent charging of another crucible, the cover must be capable of withstanding physical abuse for many furnace heats.

Crucible melting furnaces are generally capable of handling only a comparatively small charge of material, i.e. up to one ton. However, the more common furnaces have a capacity of 500 pounds and lower. Accordingly, these furnaces are utilized in the ferrous metals industry only to a limited degree. Crucible melting furnaces are primarily designed for the melting of copper and copper base alloys, for example, brass. Thus, the crucible melting furnace covers of the present invention while they are not limited thereto, are principally directed to furnaces for melting of nonferrous metals and the concomitant problems associated therewith.

Heretofore, crucible melting furnace covers were constructed of preformed discs of silicon carbide because of its known thermal shock resistance and mechanical strength. These covers were merely placed on top of a furnace without any further support and were removed by mechanical apparatus when so desired. Such covers were found to wear excessively and were subject to breakage in mechanical handling. Further, while the silicon carbide material had some of the properties desired for a cover, the material has good thermal conductivity which accounted for a high heat loss in the melting operations. The material also readily oxidized at elevated temperatures which tended to alter the high temperature and physical properties thereof. All factors being considered, the silicon carbide covers are economically unfeasible for small foundry shops, which are the primary users of crucible melting furnaces.

Attempts have been made to fabricate covers by casting a refractory material within a metal shell using various types of reinforcing means; however, such constructions have not proved to be successful to date, at least as far as I know.

Accordingly, it is an object of the present invention to provide improved crucible melting furnace covers having a relatively long service life.

Another object of the invention is to provide a crucible melting furnace cover consisting of a metal shell and a monolithic refractory lining, having strategically arranged metal anchors therein which constitute the sole means of support for the refractory.

A further object of the invention is to provide a crucible melting furnace cover characterized by having a high degree of mechanical strength and refractoriness.

Other objects of the invention will be apparent hereinafter.

In order to more fully understand the nature and scope of the present invention, reference should be had to the following detailed description and drawing in which:

FIG. 1 is a schematic elevation view, in partial section, of a crucible melting furnace; and FIG. 2 is a bottom view of a cover according to the invention.

In accordance with the present invention, there is provided a cover, having a centrally located flue opening therein, for use with a crucible melting furnace. The cover consists of a metal plate having outer peripheral downwardly extending sidewalls. A plurality of metal anchor members are secured to the metal plate and extend downwardly substantially the distance of the sidewalls and are parallel thereto. The metal anchors are preferably of a V-shaped configuration with the apex thereof being secured to the metal plate. The anchors are spaced substantially equal distances from one another. A layer of monolithic refractory material is disposed in contact with the metal plate and sidewalls and is impaled by the metal anchors. The metal anchors are completely embedded in the monolithic layer and constitute the sole means of support and reinforcement for the monolithic layer.

A preferred monolithic layer is composed of plastic refractory, analyzing on an oxide basis, at least 50%, by weight, $Al_2O_3$ and consists predominantly of mullite calcines with minor amounts of calcined alumina and ball clay.

A more detailed description follows with reference to the accompanying drawing. FIG. 1 shows a schematic illustration of a typical crucible melting furnace. The furnace contains an outer metal shell 10 which is lined with a refractory material 12. The lining generally consists of a composite of a working lining with an insulating backup material. At the base of the refractory wall lining is a burner 14 for providing the operating temperatures in the furnace. The fuel for the furnace is generally either gas, oil or coke. Adjacent the burners and below are fire bars 16 which aid in directing the heat toward the charge to be melted. The fire bar support 18 has a stand 20 usually composed of a fireclay material, seated thereon so as to provide support for the melting crucible 22 containing the charge. Below the fire bars and within the furnace substructure 24 is disposed an ash receiver 26 for reasons well known to those skilled in the art. Disposed above the crucible melting furnace is a cover 30 of the present invention. The circular configuration, shown in FIG. 2, is desirable since it conforms to the contour of the opening of the furnace and the contour of the crucible most generally used. The cover consists of a metal plate 32 having an aperture 33 therein and outer peripheral downwardly extending sidewalls 34. The aperture 33 is centrally located and provides an adequate flue opening for crucible melting. A plurality of V-shaped anchors are secured to the metal plate 32 at the apex 37 of each anchor. The anchors have legs 38 extending substantially the distance of the sidewalls 34. The extreme ends of the legs are biased inwardly for greater reinforcement of refractory. The apex 37 of each anchor may be secured to the metal plate in any manner known in the art, but preferably, by welding. The anchors are spaced at approximately 90° intervals and are substantially equidistant between the flue opening and the sidewalls (shown clearly in FIG. 2.)

A modified anchor 36A is also shown in FIG. 1. Here, the anchor contains a grommet 40 which is integral with the apex of the V-shaped configuration and passes through a slot in the metal plate. The anchor may be secured as before, to the metal plate, at the slot. The purpose of the grommet is to facilitate removal by mechanical means without handling of the cover proper.

A rammed plastic refractory lining is disposed in contact with the metal plate and sidewalls and about the metal anchors so that the anchors are completely embedded in the monolithic layer.

Merely by way of example, a group of crucible melting furnace covers were fabricated. The covers contained a metal plate with sidewalls as shown in the drawing. Metal anchors represented by the numeral 36 in the drawing, composed of a nickel-chromium alloy were welded to the metal plate 90° apart and equidistantly between the flue opening and sidewalls as is shown in FIG. 2. A refractory size graded ramming mix was prepared consisting of about 70% mullite calcines and the balance a mixture of calcined alumina and ball clay. The mix was tempered to ramming consistency (about 3% water) and was rammed with an air hammer against the metal plate and sidewalls and around the anchors using a ply wood form for the flue opening. The covers were placed in service on an experimental basis on crucible melting furnaces employed for the melting of copper alloys to determine the expected service life of such covers. It was found that after a year of continuous service, the covers were still in operation without incident and gave no indications of the necessity for replacement in the near future.

The most unique and suprising discovery made concerning the present invention is the ability of the cover to remain completely intact after repeated cycles of heating and cooling. As is well known in the art, a plastic refractory tends to shrink when exposed to high temperatures, and would separate from the metal plate and sidewalls with which it is in contact. Such a separation is somewhat desirable after removal of the cover from the furnace since there obtains a reduction in the thermal gradient between the refractory and metal shell and the shell will cool more rapidly. However, if the refractory lacks additional support, it will fall free of the shell and into the crucible.

Commonly used, rigid anchor members welded to the shell would be thought to alleviate this condition. However, when the refractory shrinks, it becomes crushed against the anchors and cracks upon cooling (expansion). On the other hand, the anchors employed in the present invention because of their V-shaped configuration offer a spring-like effect. As the plastic refractory shrinks, the anchors "give" with the refractory to prevent fracture thereof and they return with the refractory upon expansion.

Accordingly, advantages heretofore not obtainable in the prior art, are realized. The refractory separates from the metal shell upon shrinking and causes the elimination of the metal-refractory interface and consequently the high thermal gradient therebetween without deleteriously affecting the monolithic lining.

It is intended that the foregoing description and drawing be construed as illustrative and not in limitation of the invention.

Having thus described the invention in detail and with sufficient particularity as to enable those skilled in the art to practice it, what is desired to have protected by Letters Patent is set forth in the following claims.

I claim:

1. A crucible melting furnace consisting of an outer metal shell lined with refractory material delineating a crucible containing chamber and a cover, said cover consisting essentially of a metal plate having a substantially centrally located aperture therein and outer peripheral downwardly extending sidewalls, a plurality of generally V-shaped metal members, characterized by having an apex with legs emanating therefrom, secured to the undersurface of the metal plate at the apex thereof substantially equal distances apart, said legs extending substantially the distance of the sidewalls, the extreme ends of said legs being biased inwardly, the metal members being located substantially centrally between the aperture in the metal plate and sidewalls, and a layer of monolithic refractory material in contact with said metal plate and sidewalls and impaled by said V-shaped members, said monolithic layer having an opening therein in alignment with the aperture in the metal sheet, said metal members being completely embedded in said monolithic layer, whereby to constitute the sole means of support and reinforcement for the monolithic layer.

2. The furnace of claim 1 in which each V-shaped member is provided with, in addition, a grommet, disposed at the apex thereof and passes through the metal plate.

3. The furnace of claim 1 in which the monolithic refractory layer is composed of a high alumina material containing at least 50%, by weight, $Al_2O_3$, on an oxide basis.

4. The furnace of claim 1 in which the monolithic refractory layer is composed of a refractory plastic consisting predominantly of mullite calcines.

5. A cover suitable for use with a crucible melting furnace consisting essentially of a metal plate having a substantially centrally located aperture therein and outer peripheral downwardly extending sidewalls, a plurality of generally V-shaped metal members, characterized by having an apex with legs emanating therefrom, secured to the undersurface of the metal plate at the apex thereof substantially equal distances apart, said legs extending substantially the distance of the sidewalls, the metal members being located substantially centrally between the aperture in the metal plate and the sidewalls, and a layer of monolithic refractory material in contact with said monolithic layer having an opening therein in alignment with the aperture in the metal sheet, said metal members being completely embedded in said monolithic layer whereby to constitute the sole means of support and reinforcement for the monolithic layer.

6. A circular cover, having a substantially centrally located flue opening therein, suitable for use with a crucible melting furnace, consisting essentially of a metal plate having outer peripheral downwardly extending sidewalls, a plurality of generally V-shaped metal members, characterized by having an apex with legs emanating therefrom secured to the undersurface of the metal plate at the apex thereof at approximately 90° intervals substantially equidistantly between the flue opening and the sidewalls, said legs extending substantially the distance of the sidewalls, the extreme ends of said legs being biased inwardly, and a layer of monolithic refractory material in contact with said metal plate and sidewalls and impaled by said V-shaped members, said members being completely embedded in said monolithic layer, to constitute the sole means of support and reinforcement for the monolithic layer.

References Cited

UNITED STATES PATENTS

| | | | |
|---|---|---|---|
| 1,251,150 | 12/1917 | Widmer | 25—118 |
| 2,231,774 | 2/1941 | Rigdon | 249—204 |
| 2,358,652 | 9/1944 | Nicholas | 266—43 X |
| 2,655,550 | 10/1953 | Zvanut | 266—33 X |

J. SPENCER OVERHOLSER, *Primary Examiner.*

E. MAR, *Assistant Examiner.*